United States Patent
Ma et al.

(10) Patent No.: US 9,166,263 B2
(45) Date of Patent: Oct. 20, 2015

(54) ANODE FOR LITHIUM AIR BATTERY AND LITHIUM AIR BATTERY INCLUDING THE ANODE

(71) Applicant: Samsung Electronics Co., Ltd., Suwon-si, Gyeonggi-do (KR)

(72) Inventors: Sang-bok Ma, Suwon-si (KR); Min-sik Park, Hwaseong-si (KR); Dong-joon Lee, Yongin-si (KR); Dong-min Im, Seoul (KR)

(73) Assignee: SAMSUNG ELECTRONICS CO., LTD. (KR)

( * ) Notice: Subject to any disclaimer, the term of this patent is extended or adjusted under 35 U.S.C. 154(b) by 302 days.

(21) Appl. No.: 13/795,157

(22) Filed: Mar. 12, 2013

(65) Prior Publication Data
US 2014/0011101 A1    Jan. 9, 2014

(30) Foreign Application Priority Data
Jul. 6, 2012    (KR) .................. 10-2012-0074108

(51) Int. Cl.
| | |
|---|---|
| H01M 6/04 | (2006.01) |
| H01M 4/13 | (2010.01) |
| H01M 2/16 | (2006.01) |
| H01M 4/36 | (2006.01) |
| H01M 12/08 | (2006.01) |
| H01M 4/134 | (2010.01) |
| H01M 12/06 | (2006.01) |

(52) U.S. Cl.
CPC .............. *H01M 12/08* (2013.01); *H01M 4/134* (2013.01); *H01M 12/06* (2013.01); *H01M 2300/0025* (2013.01); *H01M 2300/0068* (2013.01); *H01M 2300/0094* (2013.01); *Y02E 60/122* (2013.01)

(58) Field of Classification Search
CPC ..... H01M 12/08; H01M 4/134; H01M 12/06; H01M 2300/0025; H01M 2300/0068; H01M 2300/0094; Y02E 60/122
USPC ............................ 429/405, 188, 231.8, 246
See application file for complete search history.

(56) References Cited

U.S. PATENT DOCUMENTS

| | | | |
|---|---|---|---|
| 7,390,591 B2 | 6/2008 | Visco et al. | |
| 2011/0059355 A1* | 3/2011 | Zhang et al. | 429/188 |
| 2011/0104571 A1 | 5/2011 | Zhamu et al. | |
| 2011/0281184 A1 | 11/2011 | Friesen et al. | |
| 2012/0082890 A1 | 4/2012 | Dong et al. | |

FOREIGN PATENT DOCUMENTS

| | | |
|---|---|---|
| JP | 2008-066202 A | 3/2008 |
| KR | 1020120011322 A | 2/2012 |

* cited by examiner

*Primary Examiner* — William Cheung
(74) *Attorney, Agent, or Firm* — Cantor Colburn LLP

(57) ABSTRACT

An anode for a lithium air battery including an anode active material layer including an anode active material; a first protective layer disposed on the anode active material layer; and a second protective layer disposed on the first protective layer, wherein the first protective layer includes a liquid electrolyte having a viscosity of 5 centipoise or less at a temperature of 20° C., and the second protective layer includes an ion conductive solid electrolyte membrane.

22 Claims, 2 Drawing Sheets

ANODE FOR LITHIUM AIR BATTERY AND LITHIUM AIR BATTERY INCLUDING THE ANODE

This application claims priority to and the benefit of Korean Patent Application No. 10-2012-0074108, filed on Jul. 6, 2012, and all the benefits accruing therefrom under 35 U.S.C. §119, the content of which is incorporated herein in its entirety by reference.

BACKGROUND

1. Field

Embodiments of the present disclosure relate to an anode for a lithium air battery and a lithium air battery including the anode.

2. Description of the Related Art

A lithium air battery generally includes an anode including lithium, e.g., an anode capable of intercalating and deintercalating lithium ions, a cathode that oxidizes and reduces oxygen from the air, and an electrolyte disposed between the cathode and the anode.

Since the lithium air battery may use lithium metal as a negative electrode and does not have to store air which is used as a positive active material (i.e., oxygen in air) within the battery, the lithium air battery may have high capacity. A lithium air battery has a high theoretical specific energy of 3,500 Wh/kg or greater, which is about ten times greater than that of a lithium ion battery.

When an anode of an air lithium battery is a lithium metal, a lithium dendrite is formed on a surface of the anode during charging and discharging. The dendrite may cause a short circuit, and thus deterioration of the battery is accelerated.

Therefore, there remains need for methods to improve the lifespan of a lithium air battery.

SUMMARY

Embodiments of the present disclosure include a lithium air battery with a significantly improved lifespan by including an anode for a lithium battery, wherein the anode for a lithium battery includes a protective layer including a liquid electrolyte with a low viscosity.

Additional aspects will be set forth in part in the description which follows and, in part, will be apparent from the description, or may be learned by practice of the presented embodiments.

According to an embodiment, an anode for a lithium air battery includes an anode active material layer including an anode active material; a first protective layer disposed on the anode active material layer; and a second protective layer disposed on the first protective layer, wherein the first protective layer includes a liquid electrolyte having a viscosity of 5 centipoise (cps) or less at a temperature of 20° C., and the second protective layer includes an ion conductive solid electrolyte membrane.

According to an embodiment, a lithium air battery includes the anode above; a cathode spaced apart from the anode and wherein the cathode is effective to utilize oxygen as a cathode active material; and a liquid electrolyte disposed between the cathode and the anode.

Also disclosed is a method of manufacturing an anode for a lithium air battery, the method including: providing an anode active material layer; disposing a liquid electrolyte having a viscosity of 5 centipoise or less at 20° C. on the anode active material to form a first protective layer on the anode active material layer; and disposing an ion conductive solid electrolyte membrane on the anode active material layer to form a second protective layer and manufacture the anode.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
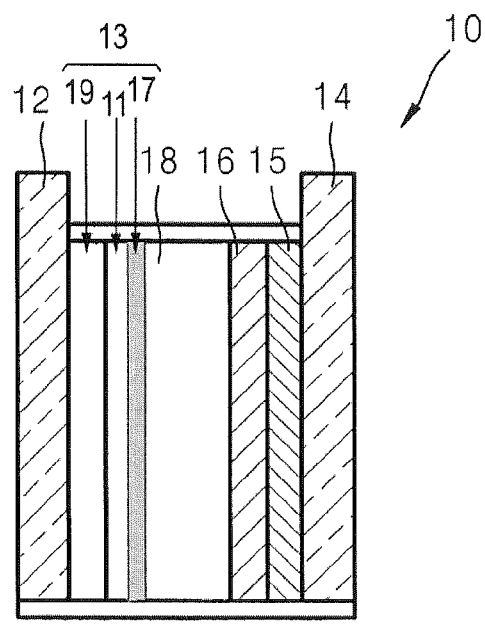
FIG. 1 is a schematic view illustrating a structure of an embodiment of a lithium air battery.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer, or section discussed below could be termed a second element, component, region, layer, or section without departing from the teachings of the present embodiments.

The terminology used herein is for the purpose of describing particular embodiments only and is not intended to be limiting. As used herein, the singular forms "a," "an" and "the" are intended to include the plural forms as well, unless the context clearly indicates otherwise. As used herein, the term "and/or" includes any and all combinations of one or more of the associated listed. The term "or" means "and/or." It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this general inventive concept belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

"Alkyl" as used herein means a monovalent group derived from a straight or branched chain saturated aliphatic hydrocarbon having the specified number of carbon atoms.

"Aryl" as used herein means a monovalent group derived from a cyclic hydrocarbon wherein all ring members are carbon and at least one ring is aromatic, and having the specified number of carbon atoms.

Hereinafter, an anode for a lithium air battery and a lithium air battery will be described more fully with reference to exemplary embodiments.

The anode for a lithium air battery according to an embodiment includes an anode active material layer including an anode active material; a first protective layer disposed on a surface of the anode active material layer which is opposite a cathode; and a second protective layer disposed on the first protective layer, wherein the first protective layer includes a liquid electrolyte having a viscosity of 5 centipoise (cps) or less (i.e., 0.005 milliPascal-seconds (mPa·s) or less) at a temperature of 20° C., and the second protective layer includes an ion conductive solid electrolyte membrane.

For example, a viscosity of the liquid electrolyte included in the first protective layer may be in the range of about 0.01 cps to about 4 cps. For example, a viscosity of the liquid electrolyte included in the first protective layer may be in the range of about 0.01 cps to about 3 cps. In another embodiment, a viscosity of the liquid electrolyte included in the first protective layer may be in the range of about 0.01 cps to about 2 cps.

The lithium air battery may include an aqueous electrolyte and/or an organic electrolyte as an electrolyte. A reaction mechanism of a lithium air battery using the organic electrolyte can be represented by the following Reaction Scheme 1:

Reaction Scheme 1

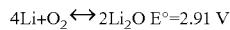
$4Li + O_2 \leftrightarrow 2Li_2O$  $E° = 2.91$ V

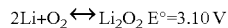
$2Li + O_2 \leftrightarrow Li_2O_2$  $E° = 3.10$ V

During discharge, lithium derived from the anode reacts with oxygen introduced from the cathode to form a lithium oxide, and as a result, the oxygen is reduced in an oxygen reduction reaction ("ORR"). Also, during charge, the lithium oxide is reduced, and oxygen is generated as a result of oxidizing the oxygen in an oxygen evolution reaction ("OER").

During discharge, a lithium oxide, e.g., lithium peroxide, $Li_2O_2$, is deposited in pores of the cathode, and an amount of the deposited lithium oxide, e.g., lithium peroxide, $Li_2O_2$, may determine a capacity of the lithium air battery. During charge, the deposited $Li_2O_2$ is oxidized, and thus lithium is deposited on the anode again.

During charge and discharge of a conventional lithium air battery, a lithium dendrite is formed on an anode and, as the lithium dendrite grows, it causes a short circuit, thus the lifespan of the lithium air battery is rapidly deteriorated.

In contrast, since an anode for a lithium air battery according to an embodiment includes a protective layer including a liquid electrolyte having a low viscosity of 5 cps or less, the growth of lithium dendrite is suppressed, and the lifespan of the lithium air battery may be significantly improved.

In the anode for a lithium air battery, an ionic radius of an anion of a lithium salt dissolved in the liquid electrolyte may be 0.5 nanometers (nm) or greater. For example, an ionic radius of an anion of a lithium salt dissolved in the liquid electrolyte may be 0.7 nm or greater. In another embodiment, an ionic radius of an anion of a lithium salt dissolved in the liquid electrolyte may be in the range of about 0.5 nm to about 5 nm. The ionic radius denotes an ionic radius of a major axis in a non-spherical ion. That is, as an ionic radius of an anion of a lithium salt increases, the lifespan of a lithium air battery may be improved.

For example, in the anode for a lithium air battery, the lithium salt included in the liquid electrolyte may include a lithium sulfonimide compound. The lithium sulfonimide may include one or more selected from a lithium fluoroalkylsulfonimide, a lithium fluoroarylsulfonimide, and lithium fluoroalkylarylsulfonimide.

For example, the lithium sulfonimide may include one or more selected from $Li(FSO_2)_2N$, $Li(CF_3SO_2)_2N$, $Li(C_2F_5SO_2)_2N$, $LiN(C_pF_{2p+1}SO_2)(C_{2q}F_{2q+1}SO_2)$ wherein p and q are different from each other and p and q are each independently an integer of 0 to 20, $LiN((SO_2)_2C_pF_{2p})$ wherein p is an integer of 1 to 10, $Li(C_6F_5SO_2)_2N$, $Li(C_{10}F_7SO_2)_2N$, $Li(C_6F_5SO_2)(C_{10}F_7SO_2)N$, $LiN(C_6F_5SO_2)(C_pF_{2p+1}SO_2)$ wherein p is an integer of 1 to 10, and $LiN(C_{10}F_7SO_2)(C_pF_{2p+1}SO_2)$ wherein p is an integer of 1 to 10.

In the anode for a lithium air battery, a concentration of the lithium salt included in the liquid electrolyte may be in the range of about 0.001 molar (M) to about 3.0 M. For example, a concentration of the lithium salt included in the liquid electrolyte of the anode for a lithium air battery may be in the range of about 0.001 M to about 2.0 M. In another embodiment, a concentration of the lithium salt included in the liquid electrolyte of the anode for a lithium air battery may be in the range of about 0.001 M to about 1.0 M. When a concentration of the lithium salt is too high, a viscosity of the liquid electrolyte increases, and thus the lifespan of the lithium air battery may be reduced. However, when a concentration of the lithium salt is too low, a resistance of an organic electrolyte solution may increase.

In the anode for a lithium air battery, a molecular weight of a solvent included in the liquid electrolyte may be in the range of about 30 grams per mole (g/mol) to about 500 g/mol. For example, a molecular weight of a solvent included in the liquid electrolyte of the anode for a lithium air battery may be in the range of about 30 g/mol to about 400 g/mol. For example, a molecular weight of a solvent included in the liquid electrolyte of the anode for a lithium air battery may be in the range of about 30 g/mol to about 300 g/mol. For example, a molecular weight of a solvent included in the liquid electrolyte of the anode for a lithium air battery may be in the range of about 30 g/mol to about 200 g/mol. When a molecular weight of the solvent is too high, a viscosity of the liquid electrolyte increases, and thus the lifespan of the lithium air battery may be reduced.

In the anode for a lithium air battery, the liquid electrolyte may include one or more selected from a carbonate solvent, an ester solvent, an ether solvent, a ketone solvent, an amine solvent, a nitrile solvent, an amide solvent, a sulfone solvent, and an ionic liquid solvent. The carbonate solvent includes a solvent containing a carbonate group (—OC(=O)O—). The ester solvent includes a solvent containing an ester group (—C(=O)O—). The ether solvent includes a solvent containing an ether group (—O—). The ketone solvent includes a solvent containing a ketone group (—C(=O)—). The amine solvent includes a solvent containing an amine group (—N=). The nitrile solvent includes a solvent containing a nitrile group (—CN). The amide solvent includes a solvent containing an amide group (—C(=O)N=). The sulfone solvent includes a solvent containing a sulfone bond (—S(=O)$_2$—).

For example, the liquid electrolyte may include one or more selected from a carbonate solvent represented by Formulas 1 and 2 below:

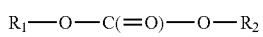

Formula 1

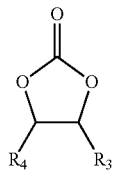

Formula 2 wherein $R_1$, $R_2$, $R_3$, and $R_4$ are each independently a $C_1$-$C_5$ alkyl group which is unsubstituted or substituted with a halogen. The halogen may be one or more selected from fluorine (F), chlorine (Cl), bromine (Br), and iodine (I).

For example, the liquid electrolyte may include one or more selected from an ether solvent represented by Formulas 3 through 8 below:

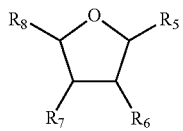

Formula 3

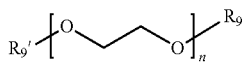

Formula 4

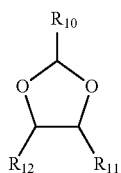

Formula 5

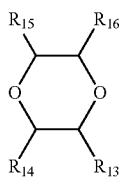

Formula 6

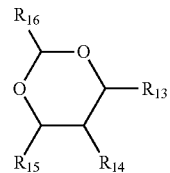

Formula 7

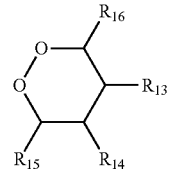

Formula 8 wherein n is an integer of 1 to 10, and $R_5$, $R_6$, $R_7$, $R_8$, $R_9$, $R_9'$, $R_{10}$, $R_{11}$, $R_{12}$, $R_{13}$, $R_{14}$, $R_{15}$, and $R_{16}$ are each independently a $C_1$-$C_5$ alkyl group which is unsubstituted or substituted with a halogen. The halogen may be one or more selected from F, Cl, Br, and I.

For example, the liquid electrolyte may include a sulfone solvent represented by Formula 9:

Formula 9 wherein $R_{17}$, $R_{18}$, $R_{19}$, and $R_{20}$ are each independently a $C_1$-$C_5$ alkyl group which is unsubstituted or substituted with a halogen. The halogen may be one or more selected from F, Cl, Br, and I.

For example, the liquid electrolyte may include one or more solvents selected from dimethyl carbonate ("DMC"), diethyl carbonate ("DEC"), ethyl methyl carbonate ("EMC"), dipropyl carbonate ("DPC"), methylpropyl carbonate ("MPC"), ethylpropyl carbonate ("EPC"), ethylene carbonate ("EC"), propylene carbonate ("PC"), butylene carbonate ("BC"), methyl acetate, ethyl acetate, n-propyl acetate, dimethyl acetate, methyl propionate, ethyl propionate, γ-butyrolactone, decanolide, valerolactone, mevalonolactone, caprolactone, dibutyl ether, tetraglyme, diglyme, polyethyleneglycoldimethylether, diethyleneglycol dimethylether, dimethoxyethane, 2-methyltetrahydrofuran, 2,2-dimethyltetrahydrofuran, 2,5-dimethyltetrahydrofuran, tetrahydrofuran, cyclohexanone, triethylamine, triphenylamine, triethylphosphineoxide, acetonitrile, dimethylformamide, 1,3-dioxolane, sulfolane, triglyme, methylbutylether, and ethylbutylether.

The liquid electrolyte, which comprises one or more solvents selected from the carbonate solvent, ester solvent, ether solvent, ketone solvent, amine solvent, nitrile solvent, amide solvent, sulfone solvent, and ionic liquid solvent, may have a viscosity of 5 cps or less at a temperature of 20° C. That is, the liquid electrolyte may include a solvent with a low viscosity of 5 cps or less, specifically a viscosity of about 0.01 cps to about 4 cps, at a temperature of 20° C.

In the liquid electrolyte, a content of the solvent may be 50 percent by weight (wt %) or greater based on the total weight of the liquid electrolyte. For example, a content of the solvent may be in the range of about 50 wt % to about 99 wt %, specifically about 55 wt % to about 95 wt %, based on the total weight of the liquid electrolyte.

In the anode for a lithium air battery, a conductivity of the liquid electrolyte may be 0.01 Siemens per meter (S/m) or greater at a temperature of 20° C. For example, a conductivity of the liquid electrolyte in the anode for a lithium air battery may be 0.05 S/m or greater at a temperature of 20° C. In another embodiment, a conductivity of the liquid electrolyte in the anode for a lithium air battery may be 0.1 S/m or greater at a temperature of 20° C. In still another embodiment, a conductivity of the liquid electrolyte in the anode for a lithium air battery may be 0.5 S/m or greater at a temperature of 20° C. When a conductivity of the liquid electrolyte is too low, a resistance of the liquid electrolyte may increase, and thus the high rate capability of the lithium air battery may be reduced.

In the anode for a lithium air battery, the first protective layer may further optionally include a separator. For example, the liquid electrolyte described above may be disposed in, e.g., injected into, the separator of the first protective layer. The anode active material layer and the second protective layer may be effectively or substantially prevented from directly contacting each other by the separator within the first protective layer.

The separator is not limited as long as the separator comprises a composition having suitable durability in its operating environment. Thus, the separator may porous, for example in the form of non-woven or woven fabric comprising one or more selected from glass fibers, fibers comprising a polypropylene material, and fibers comprising a polyphenylene sulfide material, or a combination thereof; or a porous film comprising an olefin resin such as polyethylene, polypropylene, and the like, and a combination thereof.

Also, the separator may be a solid layer having a suitably low resistance to migration of ions in an electrolyte and have an excellent electrolyte-retaining ability. Examples of materials that may be used in a separator of this type may include one or more selected from polyester, polyethylene, polypropylene, and polytetrafluoroethylene ("PTFE", e.g., TEFLON), and a combination thereof. Each of the foregoing materials may also be in the form of fibers provided as a non-woven or woven fabric.

For example, the solid separator may be manufactured in the following manner.

A polymer resin, a filler, and a solvent may be mixed together to prepare a separator composition. Then, the separator composition may be directly coated on an anode active material layer and dried to form the separator. Alternatively, the separator composition may be cast on a support and dried to form a separator film, and the separator film, which is separated from the support, may be laminated on an anode active material layer to form the separator.

The polymer resin used to manufacture the separator is not particularly limited and may be any suitable material that is used as a binder for electrode plates. Examples of the polymer resin may include one or more selected from polyethylene, polypropylene, vinylidenefluoride/hexafluoropropylene copolymer, polyvinylidene fluoride ("PVDF"), polyacrylonitrile, polymethylmethacrylate, and a mixture thereof. The separator may comprise a filler. The filler used to manufacture the separator may comprise inorganic particles or the like, and the solvent may be any suitable solvent that is capable of dissolving the polymer resin and capable of forming pores in the polymer resin during the drying process and is used in the art.

Alternatively, the separator may be separately manufactured and laminated on the anode active material layer. For example, a dry method for forming a microporous membrane may be used, wherein polypropylene and polyethylene may be melted and extruded to prepare a film, and then the film may be annealed at a low temperature to grow crystalline domains. Then, the crystalline domains may be stretched to extend amorphous regions. Particularly, a wet method for forming a microporous membrane may be used, wherein a hydrocarbon solvent and/or other small molecule material is combined with polypropylene, polyethylene, and the like to form a film, and subsequently, the solvent and/or the small molecule may be removed from the film using a volatile solvent, while the solvent or the small molecule, gathered in the amorphous phases, starts forming an island phase within the film.

Also, the separator may further include an additive, such as a non-conductive particle, or other filler, or a fibrous compound to control a degree of strength or hardness and a thermal shrinkage. For example, the separator may further include inorganic particles, to improve the oxidation resistance of the separator and suppress the degradation of desirable battery characteristics. The inorganic particles may comprise an oxide, such as one or more selected from alumina ($Al_2O_3$), silica ($SiO_2$), and titania ($TiO_2$). An average particle diameter of the inorganic particles may be in the range of about 10 nm to about 5 micrometers (μm), specifically about 100 nm to about 1 μm. When an average particle diameter is less than about 10 nm, the crystallinity of the inorganic particles may be deteriorated, and thus the effect of addition of the inorganic particles may be reduced. Also, when an average particle diameter is greater than about 5 μm, the dispersion of the inorganic particles may be difficult.

The separator may have a multi-layer structure including one or more polymer layers to increase a tearing strength or a mechanical strength. Examples of the structure of the separator may be a laminated structure of one or more selected from polyethylene/polypropylene, a laminated structure of polyethylene/polypropylene/polyethylene, and a laminated structure of non-woven fabric/polyolefin.

In the anode for a lithium air battery, the anode active material may be a lithium metal, a lithium metal alloy, or a lithium intercalation compound, but is not limited thereto, and any suitable material available as an anode active material in the art which includes lithium or is capable of intercalating and deintercalating lithium may be used. As used herein, a lithium intercalation compound is a compound which is capable of intercalating and deintercalating lithium. The anode active material can be a significant factor in determining the capacity of the lithium air battery. The anode may be, for example, a lithium metal. Examples of the lithium alloy include alloys comprising one or more selected from aluminum (Al), tin (Sn), magnesium (Mg), indium (In), calcium (Ca), titanium (Ti), and vanadium (V). Lithium metal is specifically mentioned.

In the anode for a lithium air battery, the ion conductive solid electrolyte membrane included in the second protective layer may be a lithium ion conductive solid electrolyte membrane. The ion conductive solid electrolyte membrane may serve as a protective layer that protects lithium included in the anode from directly contacting, e.g., reacting with, the liquid electrolyte, including impurities included in the liquid electrolyte.

Examples of the ion conductive solid electrolyte membrane include one or more selected from lithium ion conductive glass, a crystalline lithium ion conductive material, e.g., a ceramic or a glass-ceramic, and inorganic particles comprising a combination thereof, but are not limited thereto, and any suitable solid electrolyte membrane available in the art, which has a lithium ion conductivity and is capable of protecting an anode, may be used. In consideration of the chemical stability of the solid electrolyte membrane, an example of the lithium ion conductive solid electrolyte membrane may be an oxide. The lithium ion conductive solid electrolyte membrane may be any suitable material commonly known in the art as having a lithium super-ion-conductor ("LISICON") structure.

An example of the crystalline lithium ion conductive material may be $Li_{1+x+y}(Al, Ga)_x(Ti, Ge)_{2-x}Si_yP_{3-y}O_{12}$ wherein $0 \leq x \leq 1$ and $0 \leq y \leq 1$, for example $0 \leq x \leq 0.4$ and $0 \leq y \leq 0.6$, or $0.1 \leq x \leq 0.3$ and $0.1 \leq y \leq 0.4$. Examples of the lithium ion conductive glass-ceramic may include one or more selected from a lithium-aluminum-germanium-phosphate ("LAGP"), lithium-aluminum-titanium-phosphate ("LATP"), lithium-aluminum-titanium-silicon-phosphate ("LATSP"), and the like.

The lithium ion conductive solid electrolyte membrane may further include a polymer solid electrolyte component, in addition to a glass-ceramic component. Examples of the polymer solid electrolyte may include one or more selected from $LiN(SO_2CF_2CF_3)_2$, $LiBF_4$, $LiPF_6$, $LiSbF_6$, $LiAsF_6$, $LiClO_4$, $LiCF_3SO_3$, $LiN(SO_2CF_3)_2$, $LiN(SO_2C_2F_5)_2$, $LiC(SO_2CF_3)_3$, $LiN(SO_3CF_3)_2$, $LiC_4F_9SO_3$, $LiAlCl_4$, and the like.

The lithium ion conductive solid electrolyte membrane may further include an inorganic solid electrolyte component, in addition to the glass-ceramic component. Examples of the inorganic solid electrolyte component may include one or more selected from $Cu_3N$, $Li_3N$, lithium oxynitride phosphorous ("LiPON"), and the like.

In the anode for a lithium air battery, a thickness of the first protective layer may be in the range of about 0.5 μm to about 500 μm, specifically about 1 μm to about 400 μm. When a thickness of the first protective layer is too great, a resistance of the lithium air battery may increase and an energy density of the lithium air battery may decrease.

In the anode for a lithium air battery, a thickness of the second protective layer may be in the range of about 0.5 μm to about 300 μm, specifically about 1 μm to about 200 μm. When a thickness of the second protective layer is too great, the conduction of the lithium ions may be difficult, and as a weight of the lithium air battery increases, the specific energy of the lithium air battery may decrease.

A lithium air battery according to another embodiment includes the anode for a lithium air battery disclosed above; a cathode spaced apart from the anode, wherein the cathode is effective to utilize oxygen as a cathode active material; and a liquid electrolyte disposed between the cathode and the anode.

The lithium air battery according to another embodiment may include the anode having a protective layer including the organic electrolyte solution as described above, and thus the lifespan of the lithium air battery may be improved.

The lithium air battery may further include a separator between the anode and the cathode. The separator may be selected from the separators included in the first protective layer of the anode described above, and thus the foregoing description of separators is not repeated for clarity. For example, the separator may be substantially the same as the separator included in the first protective layer of the anode described above.

In the lithium air battery, the cathode, which is effective to use oxygen as a cathode active material, may include a conductive material. The conductive material may be porous. Any suitable porous and conductive material may be used as a material of the cathode, and for example, a porous carbonaceous material may be used. Examples of the carbonaceous material include one or more selected from carbon black, graphite, graphene, activated carbon, carbon fiber, and the like. Also, metallic conductive materials, such as a metal fiber and/or a metal mesh, or the like may be used. Moreover, metal powder of copper, silver, nickel, aluminum, and the like may be used. Organic conductive materials, including polyphenylene derivatives, may be used. The above-listed conductive materials may be used alone or in combination.

The cathode may further include a catalyst that helps oxidation and reduction of oxygen. Examples of the catalyst include, but are not limited to, one or more selected from a noble metal catalysts, such as one or more selected from platinum (Pt), gold (Au), silver (Ag), palladium (Pd), ruthenium (Ru), rhodium (Rh), and osmium (Os); an oxide catalysts, such as one or more selected from manganese oxide, iron oxide, cobalt oxide, and nickel oxide; and one or more selected from an organic metal catalysts, such as cobalt phthalocyanine. Any suitable catalyst for oxidizing and reducing oxygen available in the art may be used.

The catalyst may be disposed on a support. Examples of the support include one or more selected from oxide, zeolite, clay mineral, and carbon. The oxide may include one or more oxides selected from alumina, silica, zirconium oxide, and titanium dioxide. The oxide may be an oxide of one or more selected from cerium (Ce), praseodymium (Pr), samarium (Sm), europium (Eu), terbium (Tb), thulium (Tm), ytterbium (Yb), antimony (Sb), bismuth (Bi), vanadium (V), chromium (Cr), manganese (Mn), iron (Fe), cobalt (Co), nickel (Ni), copper (Cu), niobium (Nb), molybdenum (Mo), and tungsten (W). Examples of the carbon available as the support include, but are not limited to, one or more selected from carbon black, such as Ketjen black, acetylene black, channel black, and lamp black; graphite, such as natural graphite, artificial graphite, and expanded graphite; activated carbon; and carbon fibers. Any suitable material available as supports in the art may be used.

The cathode may further include a binder. The binder may include a thermoplastic resin or a thermocurable resin, i.e., a thermoset. Examples of the binder include, but are not limited to, one or more selected from polyethylene, polypropylene, polytetrafluoroethylene ("PTFE"), polyvinylidene fluoride ("PVDF"), styrene-butadiene rubber, a tetrafluoroethylene-perfluoroalkylvinylether copolymer, a vinylidene fluoride-hexafluoropropylene copolymer, a vinylidene fluoride-chlorotrifluoroethylene copolymer, an ethylene-tetrafluoroethylene copolymer, polychlorotrifluoroethylene, a fluorovinylidene-pentafluoro propylene copolymer, a propylene-tetrafluoroethylene copolymer, an ethylene-chlorotrifluoroethylene copolymer, a vinylidene fluoride-hexafluoropropylene-tetrafluoroethylene copolymer, a vinylidene fluoride-perfluoromethylvinylether-tetrafluoroethylene copolymer, and an ethylene-acrylic acid copolymer, which may be used alone or in combination. Any suitable binder available in the art may be used.

To manufacture the cathode, an oxygen oxidation/reduction catalyst, a conductive material, and a binder may be mixed, and then may be added to a suitable solvent to prepare a cathode slurry. The cathode slurry may be coated and dried on a surface of a current collector, optionally followed by press-molding to improve an electrode density, thereby resulting in the cathode. The cathode may optionally include a lithium oxide, e.g., a peroxide. The oxygen oxidation/reduction catalyst may be optionally omitted.

A porous body in a matrix or mesh form may be used as a current collector to facilitate diffusion of oxygen. A porous metal plate comprising, for example, stainless steel, nickel, or aluminum may be used. Materials of the current collector are not particularly limited, and any suitable material for a current collector available in the art may be used. The current collector may be coated with an anti-oxidation metal or an alloy coating film to prevent oxidation.

In the lithium air battery, the liquid electrolyte disposed between the cathode and the anode may be same as the liquid electrolyte included in the first protective layer of the anode for a lithium air battery described above.

Alternatively, the liquid electrolyte disposed between the cathode and the anode in the lithium air battery may be a conventional aqueous and/or organic liquid electrolyte.

The organic electrolyte of the lithium air battery may include an aprotic solvent. Examples of the aprotic solvent include one or more selected from a carbonate, ester, ether, ketone, and alcohol solvents. Examples of the carbonate solvents available as the nonaqueous organic solvent may include one or more selected from dimethyl carbonate ("DMC"), diethyl carbonate ("DEC"), ethyl methyl carbonate ("EMC"), dipropyl carbonate ("DPC"), methyl propyl carbonate ("MPC"), ethyl propyl carbonate ("EPC"), methylethyl carbonate ("MEC"), ethylene carbonate ("EC"), propylene carbonate ("PC"), and butylene carbonate ("BC"). Examples of the ester solvents available as the nonaqueous organic solvent may include one or more selected from methyl acetate, ethyl acetate, n-propyl acetate, dimethyl acetate, methyl propionate, ethyl propionate, γ-butyrolactone, decanolide, valerolactone, mevalonolactone, and caprolactone. Examples of the ether solvents available as the nonaqueous organic solvent may include one or more selected from dibutyl ether, tetraglyme, diglyme, dimethoxyethane, 2-methyltetrahydrofuran, and tetrahydrofuran. An example of the ketones available as the nonaqueous organic solvent may be cyclohexanone. Examples of the alcohol solvents include ethyl alcohol and isopropyl alcohol. However, any appropriate aprotic solvent available in the art may be used without limitation.

Examples of the aprotic solvent include one or more selected from a nitrile such as a nitrile of the formula R—CN (wherein R is a $C_2$-$C_{20}$ linear, branched, or cyclic hydrocarbon moiety that may include a double-bonded aromatic ring or an ether bond), an amide such as dimethylformamide, a dioxolane such as 1,3-dioxolane, and a sulfolane.

The aprotic solvent may be used either alone or in a combination of one or more solvents. A ratio of the aprotic solvents may be appropriately selected depending on a desired performance of the battery, and can be determined by one of skill in the art without undue experimentation.

The organic electrolyte may include an ionic liquid. Examples of the ionic liquid include those with cations such as one or more selected from ammonium substituted with a linear or a branched alkyl group, imidazolium substituted with a linear or a branched alkyl group, pyrrolidinium substituted with a linear or a branched alkyl group, and piperidinium substituted with a linear or a branched alkyl group, and anions such as one or more selected from $PF_6^-$, $BF_4^-$, $CF_3SO_3^-$, $(CF_3SO_2)_2N^-$, $(C_2F_6SO_2)_2N^-$, $(C_2F_6SO_2)_2N^-$, and $(CN)_2N^-$.

The organic electrolyte may include a salt of an alkali metal and/or an alkali earth metal. The salt of the alkali metal and/or alkali earth metal, dissolved in an organic solvent, may be used as a source of alkali metal ions and/or alkali earth metal ions in the battery. The salt may facilitate migration of the alkali metal ions and/or alkali earth metal ions between the cathode and the anode.

For example, cations of the alkali metal salt and/or alkali earth metal salt may include one or more selected from lithium ions, sodium ions, magnesium ions, potassium ions, calcium ions, rubidium ions, strontium ions, cesium ions, barium ions, and the like.

Anions of the alkali metal salt and/or alkali earth metal salt in the organic electrolyte may include one or more ions selected from $PF_6^-$, $BF_4^-$, $SbF_6^-$, $AsF_6^-$, $C_4F_9SO_3^-$, $ClO_4^-$, $AlO_2^-$, $AlCl_4^-$, $C_xF_{2x+1}SO_3^-$ (wherein x is a natural number), $(C_xF_{2x+1}SO_2)(C_yF_{2y+1}SO_2)N^-$ (wherein x and y are natural numbers), and halide.

The salt of the alkali metal and/or alkali earth metal may include, but is not limited to, one or more selected from $LiPF_6$, $LiBF_4$, $LiSbF_6$, $LiAsF_6$, $LiN(SO_2C_2F_5)_2$, $Li(CF_3SO_2)_2N$, $LiC_4F_9SO_3$, $LiClO_4$, $LiAlO_2$, $LiAlCl_4$, $LiN(C_xF_{2x+1}SO_2)(C_yF_{2y+1}SO_2)$ (wherein x and y are natural numbers), LiF, LiBr, LiCl, LiI, and $LiB(C_2O_4)_2$ ("LiBOB"; lithium bis(oxalato)borate). Any suitable alkali metal and/or alkali earth metal salts available in the art may be used.

In the organic electrolyte, an amount of the salt of the alkali metal and/or alkali earth metal may be in the range of about 100 mM to about 10 M, for example, about 500 mM to about 2 M. The amount of the salt of the alkali metal and/or alkali earth metal is not particularly limited, and may be selected as long as the organic electrolyte may effectively transfer electrons during charging and discharging.

An example of manufacturing the lithium air battery is as follows:

First, an oxygen oxidation/reduction catalyst, a conductive material, and a binder are contacted, e.g., mixed, and then added to an appropriate solvent to prepare a cathode slurry. The cathode slurry is coated and then dried on a surface of a current collector, optionally followed by press-molding in order to improve an electrode density, thereby preparing a cathode. The oxygen oxidation/reduction catalyst may be optionally omitted.

Next, an anode active material layer is mounted in one side of a case, and a spacer including an empty space is mounted on the anode active material layer. Then, an ion conductive solid electrolyte membrane is disposed on the spacer, and an electrolyte with a low viscosity is injected to the empty space of the spacer, thereby mounting an anode. A porous separator may be used instead of the spacer.

Next, a cathode with a separator is mounted on a side opposite to the anode and within the case. Subsequently, an electrolyte is injected between the cathode and the anode, a porous current collector is disposed on the positive electrode, and a pressing member that allows air to reach the cathode is pressed to fix a cell, thereby completing the manufacture of the lithium air battery. A lithium ion conductive solid electrolyte membrane may be further disposed on a surface of the anode.

The case may be divided into upper and lower parts, which contact the anode and cathode, respectively. An insulating resin may be interposed between the upper and lower parts to electrically insulate the cathode and anode from each other.

The lithium air battery is available either as a lithium primary battery or a lithium secondary battery. The lithium air battery may have any suitable shape, may be prismatic or cylindrical, and for example, may have a shape like a coin, a button, a sheet, a stack, a cylinder, a plane, or a horn. The lithium air battery may be applied to a large battery for electric vehicles.

FIG. 1 is a schematic view of a lithium air battery 10 according to an embodiment. The lithium air battery 10 includes a cathode 15 which can use oxygen as an active material and is disposed on a first current collector 14, an anode 13 including lithium and disposed adjacent to a second current collector 12, an organic electrolyte 18 disposed between the cathode 15 and the anode 13, and an additional separator 16 disposed on a surface of the cathode 15. The anode 13 includes an anode active material layer 19, a first protective layer 11 disposed on the anode active material layer 19, and a lithium ion conductive solid electrolyte membrane 17 disposed on the first protective layer 11. The first protective layer 11 includes a liquid electrolyte with a low viscosity. The first current collector 14, which is porous, may serve as a gas diffusion layer allowing diffusion of gas. Although not illustrated, a pressing member allowing air to reach the positive electrode 15 may be further disposed on the first current collector 14.

As used herein, the term "air" is not limited to atmospheric air, and may refer to a combination of gases including oxygen, or pure oxygen gas. This broad definition of "air" also applies to other terms, including an air battery, air electrode, or the like.

Hereinafter, an embodiment will be described in further detail with reference to the following examples. However, these examples shall not limit the scope of the disclosed embodiment.

Preparation of Liquid Electrolyte

Preparation Example 1

1 M $Li(CF_3SO_2)_2N$ ("LiTFSI", lithium bis(trifluoromethane)sulfonimide) was added to 2,5-dimethyltetrahydrofuran to prepare an organic electrolyte. An ionic radius of the TFSI anion was 0.79 nm.

Preparation Example 2

1 M $Li(CF_3SO_2)_2N$ ("LiTFSI", lithium bis(trifluoromethane)sulfonimide) was added to tetrahydrofuran to prepare an organic electrolyte.

Preparation Example 3

1 M $Li(CF_3SO_2)_2N$ ("LiTFSI", lithium bis(trifluoromethane)sulfonimide) was added to dimethoxyethane to prepare an organic electrolyte.

Preparation Example 4

1 M $Li(CF_3SO_2)_2N$ ("LiTFSI", lithium bis(trifluoromethane)sulfonimide) was added to 2-methyltetrahydrofuran to prepare an organic electrolyte.

Preparation Example 5

1 M $Li(CF_3SO_2)_2N$ ("LiTFSI", lithium bis(trifluoromethane)sulfonimide) was added to 2,2-dimethyltetrahydrofuran to prepare an organic electrolyte.

Preparation Example 6

1 M $Li(CF_3SO_2)_2N$ ("LiTFSI", lithium bis(trifluoromethane)sulfonimide) was added to diethyleneglycol dimethylether ("DEGDME") to prepare an organic electrolyte. An ionic radius of the TFSI anion was 0.79 nm.

Preparation Example 7

0.5 M $Li(CF_3SO_2)_2N$ ("LiTFSI", lithium bis(trifluorometh)sulfonimide) was added to dimethoxy ethane to prepare an organic electrolyte.

Comparative Preparation Example 1

0.5 M $Li(CF_3SO_2)_2N$ ("LiTFSI", lithium bis(trifluoromethane)sulfonimide) was dissolved in tetraethyleneglycol dimethylether ("TEGDME") to prepare an organic electrolyte.

Comparative Preparation Example 2

1 M $Li(CF_3SO_2)_2N$ ("LiTFSI", lithium bis(trifluoromethane)sulfonimide) was dissolved in tetraethyleneglycol dimethylether ("TEGDME") to prepare an organic electrolyte.

Comparative Preparation Example 3

2 M $Li(CF_3SO_2)_2N$ ("LiTFSI", lithium bis(trifluoromethane)sulfonimide) was dissolved in tetraethyleneglycol dimethylether ("TEGDME") to prepare an organic electrolyte.

Comparative Preparation Example 4

1 M $Li(CF_3SO_2)_2N$ ("LiTFSI", lithium bis(trifluoromethane)sulfonimide) was dissolved in polyethyleneglycol dimethylether ("PEGDME", a molecular weight: 500 g/mol) to prepare an organic electrolyte.

Comparative Preparation Example 5

3 M $Li(CF_3SO_2)_2N$ ("LiTFSI", lithium bis(trifluoromethane)sulfonimide) was dissolved in tetraethyleneglycol dimethylether ("TEGDME") to prepare an organic electrolyte.

Preparation of Lithium Symmetric Cell

Example 1

Figure 2:
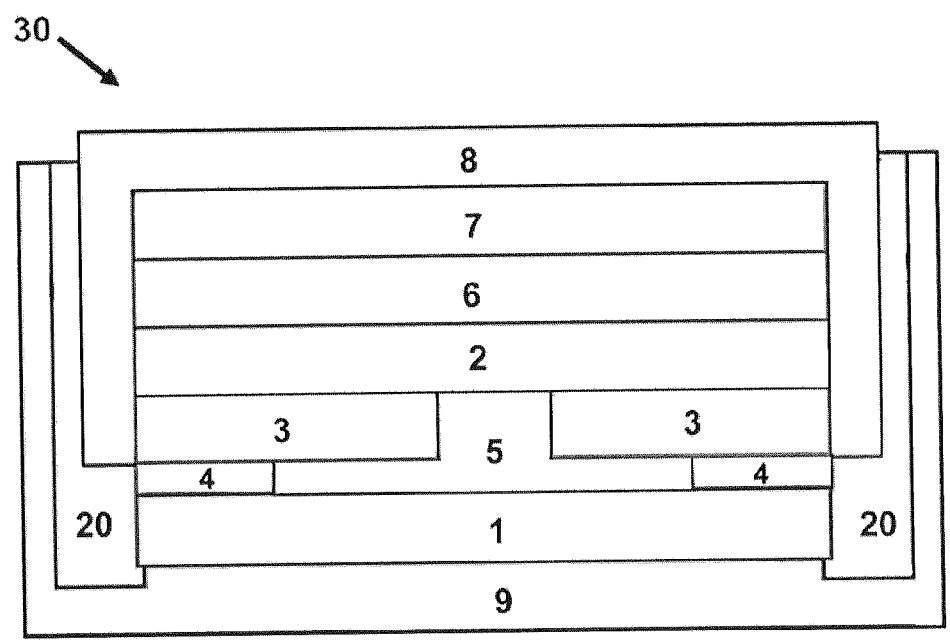
FIG. 2 is a schematic view of an embodiment of a lithium symmetric cell.

As shown in FIG. 2, a first lithium foil 1 with a diameter of 16 millimeters ("mm") and a thickness of 500 micrometers ("μm"), a polyester ("PET") film 4 with a thickness of 100 μm and a circular hole of 12 mm diameter formed in the center to block contact between lithium electrodes, a polypropylene ("PP") spacer film 3 with a thickness of 1 mm and a circular hole of 1 mm diameter formed in the center, and a second lithium foil 2 with a diameter of 16 mm and a thickness of 500 μm were sequentially disposed on a stainless case 9. Subsequently, the organic electrolyte prepared in Preparation Example 1 was injected into a space 5 between the first and second lithium foils 1 and 2, respectively, and a spacer 6 of a stainless steel ("SUS") was disposed on the second lithium foil 2. Then, a spring 7 was installed on the spacer 6, and a cell is fixed by pressing with a cap 8, thereby preparing a coin cell 30 with the symmetrical lithium electrode.

The case 9 may be divided into upper and lower parts, which contact the second lithium foil 2 and the first lithium foil 1, respectively. A gasket 20 of an insulating resin material was disposed between the upper and lower parts to electrically insulate the first and second lithium foils 1 and 2.

Example 2

A lithium symmetric cell air battery was manufactured in the same manner as in Example 1, except that the organic electrolyte of Preparation Example 2 was used.

Example 3

A lithium symmetric cell air battery was manufactured in the same manner as in Example 1, except that the organic electrolyte of Preparation Example 3 was used.

Example 4

A lithium symmetric cell air battery was manufactured in the same manner as in Example 1, except that the organic electrolyte of Preparation Example 4 was used.

Example 5

A lithium symmetric cell air battery was manufactured in the same manner as in Example 1, except that the organic electrolyte of Preparation Example 5 was used.

Example 6

A lithium symmetric cell air battery was manufactured in the same manner as in Example 1, except that the organic electrolyte of Preparation Example 6 was used.

Example 7

A lithium symmetric cell air battery was manufactured in the same manner as in Example 1, except that the organic electrolyte of Preparation Example 7 was used.

Comparative Example 1

A lithium symmetric cell air battery was manufactured in the same manner as in Example 1, except that the organic electrolyte of Comparative Preparation Example 1 was used.

Comparative Example 2

A lithium symmetric cell air battery was manufactured in the same manner as in Example 1, except that the organic electrolyte of Comparative Preparation Example 2 was used.

Comparative Example 3

A lithium symmetric cell air battery was manufactured in the same manner as in Example 1, except that the organic electrolyte of Comparative Preparation Example 3 was used.

Comparative Example 4

A lithium symmetric cell air battery was manufactured in the same manner as in Example 1, except that the organic electrolyte of Comparative Preparation Example 4 was used.

Comparative Example 5

A lithium symmetric cell air battery was manufactured in the same manner as in Example 1, except that the organic electrolyte of Comparative Preparation Example 5 was used.

Evaluation Example 1

Organic Electrolyte Property Evaluation

A viscosity and an ion conductivity of each of the organic electrolytes prepared in Examples 1 to 10 and Comparative Examples 1 to 5 were measured at a temperature of 21° C., and a part of the results are shown in Table 1 below.

TABLE 1

| Example | Viscosity [cps] | Ionic conductivity [S/m] |
|---|---|---|
| Preparation Example 1 | 1.40 | 0.01847 |
| Preparation Example 2 | 1.43 | 1.086 |
| Preparation Example 3 | 1.46 | 1.369 |
| Preparation Example 4 | 1.50 | 0.218 |
| Preparation Example 5 | 2.00 | 0.0372 |
| Preparation Example 6 | 3.70 | 0.7881 |
| Preparation Example 7 | 0.79 | 0.9134 |
| Comparative Preparation Example 1 | 6.35 | — |
| Comparative Preparation Example 2 | 13.10 | — |
| Comparative Preparation Example 3 | 63.90 | — |
| Comparative Preparation Example 4 | 89.70 | — |
| Comparative Preparation Example 5 | 116.00 | — |

As shown in Table 1, the organic electrolytes of Preparation Examples 1 to 7 have low viscosities compared to the organic electrolytes of Comparative Preparation Examples 1 to 5. Although not shown in Table 1, the ionic conductivities of the organic electrolytes of Preparation Examples are similar to the organic electrolytes of the Comparative Preparation Examples.

Evaluation Example 2

Lifespan Evaluation

A short time, which means a time need for a cell voltage to converge into zero with a constant current of 1 milliampere per square centimeter (mA/cm$^2$) or less, for each of the lithium symmetric cells prepared in Examples 1 to 7 and Comparative Examples 1 to 5 was measured, and the results are shown in Table 2 below. Also, FIG. 3 illustrates a relationship between the viscosity of Table 1 and the short time of Table 2.

TABLE 2

| | Short time (hours) |
|---|---|
| Preparation Example 1 | 44.3 |
| Preparation Example 2 | 39.8 |
| Preparation Example 3 | 56.3 |
| Preparation Example 4 | 44.4 |
| Preparation Example 5 | 45.5 |
| Preparation Example 6 | 100.1 |
| Preparation Example 7 | 78.2 |
| Comparative Preparation Example 1 | 27.2 |
| Comparative Preparation Example 2 | 22.9 |
| Comparative Preparation Example 3 | 20.8 |
| Comparative Preparation Example 4 | — |
| Comparative Preparation Example 5 | — |

Figure 3:
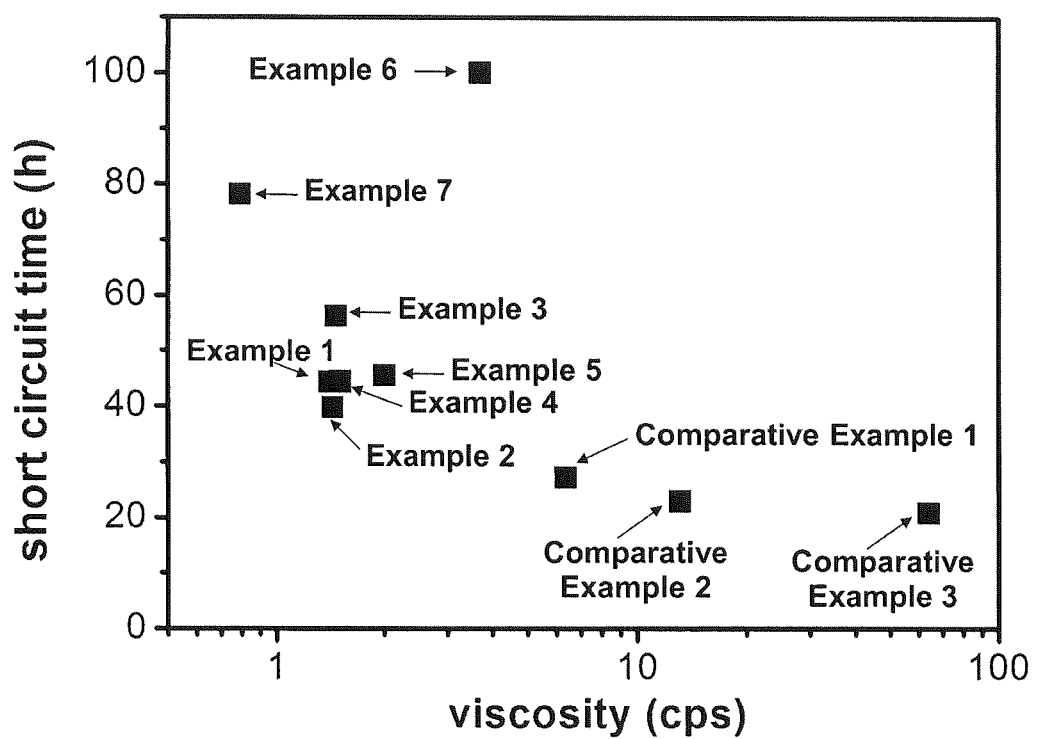
FIG. 3 is a graph of short circuit time (hours, h) versus viscosity (centipoise, cps) illustrating viscosities and short circuit times of lithium symmetric cells according to Examples 1 to 7 and Comparative Examples 1 to 3.

As shown in Table 2 and FIG. 3, a short time of a lithium symmetric cell increases as a viscosity of an electrolyte decreases. Short times of Comparative Examples 4 to 5 could not be measured because the conductivities of the lithium symmetric cells of Comparative Examples 4 to 5 were too low.

According to an aspect of the disclosed embodiment, the lifespan of a lithium air battery may be improved by including an anode, wherein the anode includes a protective layer including a liquid electrolyte with a low viscosity.

It shall be understood that the exemplary embodiment described herein shall be considered in a descriptive sense only and not for purposes of limitation. Descriptions of features, advantages, or aspects within each embodiment should be considered as available for other similar features, advantages or aspects in other embodiments.

What is claimed is:

1. An anode for a lithium air battery comprising:
an anode active material layer comprising an anode active material;
a first protective layer disposed on the anode active material layer; and
a second protective layer disposed on the first protective layer,
wherein
the first protective layer comprises a liquid electrolyte having a viscosity of 5 centipoise or less at a temperature of 20° C., and
the second protective layer comprises an ion conductive solid electrolyte membrane.

2. The anode for a lithium air battery of claim 1, wherein an ionic radius of an anion of a lithium salt of the liquid electrolyte is 0.5 nanometer or greater.

3. The anode for a lithium air battery of claim 1, wherein a lithium salt of the liquid electrolyte comprises a lithium sulfonimide compound.

4. The anode for a lithium air battery of claim 3, wherein the lithium sulfonimide compound comprises one or more selected from a lithium fluoroalkylsulfonimide, a lithium fluoroarylsulfonimide, and a lithium fluoroalkylarylsulfonimide.

5. The anode for a lithium air battery of claim 3, wherein the lithium sulfonimide compound comprises one or more selected from $Li(FSO_2)_2N$, $Li(CF_3SO_2)_2N$, $Li(C_2F_5SO_2)_2N$, $LiN(C_pF_{2p+1}SO_2)(C_qF_{2q+1}SO_2)$ wherein p and q are different from each other and p and q are each independently an integer of 0 to 20, $LiN((SO_2)_2C_pF_{2p})$ wherein p is an integer of 1 to 10, $Li(C_6F_5SO_2)_2N$, $Li(C_{10}F_7SO_2)_2N$, $Li(C_6F_5SO_2)(C_{10}F_7SO_2)N$, $LiN(C_6F_5SO_2)(C_pF_{2p+1}SO_2)$ wherein p is an integer of 1 to 10, and $LiN(C_{10}F_7SO_2)(C_pF_{2p+1}SO_2)$ wherein p is an integer of 1 to 10.

6. The anode for a lithium air battery of claim 1, wherein a concentration of a lithium salt of the liquid electrolyte is in the range of about 0.001 molar to about 3.0 molar.

7. The anode for a lithium air battery of claim 1, wherein a molecular weight of a solvent of the liquid electrolyte is in the range of about 30 grams per mole to about 500 grams per mole.

8. The anode for a lithium air battery of claim 1, wherein the liquid electrolyte comprises one or more selected from a carbonate solvent, an ester solvent, an ether solvent, a ketone solvent, an amine solvent, a nitrile solvent, an amide solvent, a sulfone solvent, and an ionic liquid solvent.

9. The anode for a lithium air battery of claim 1, wherein the liquid electrolyte comprises one or more selected from a carbonate solvent represented by Formulas 1 and 2:

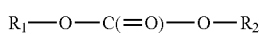

Formula 1

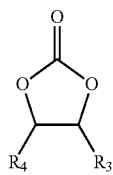

Formula 2 wherein $R_1$, $R_2$, $R_3$, and $R_4$ are each independently a $C_1$-$C_5$ alkyl group which is unsubstituted or substituted with a halogen.

10. The anode for a lithium air battery of claim 1, wherein the liquid electrolyte comprises one or more selected from an ether solvent represented by Formulas 3 through 8:

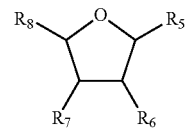

Formula 3

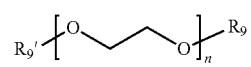

Formula 4

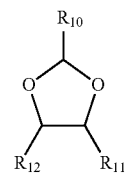

Formula 5

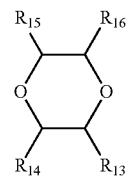

Formula 6

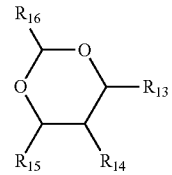

Formula 7

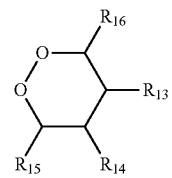

Formula 8 wherein n is an integer of 1 to 10, and $R_5$, $R_6$, $R_7$, $R_8$, $R_9$, $R_9'$, $R_{10}$, $R_{11}$, $R_{12}$, $R_{13}$, $R_{14}$, $R_{15}$, and $R_{16}$ are each independently a $C_1$-$C_5$ alkyl group which is unsubstituted or substituted with a halogen.

11. The anode for a lithium air battery of claim 1, wherein the liquid electrolyte comprises a sulfone solvent represented by Formula 9:

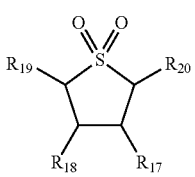

Formula 9 wherein $R_{17}$, $R_{18}$, $R_{19}$, and $R_{20}$ are each independently a $C_1$-$C_5$ alkyl group which is unsubstituted or is substituted with a halogen.

12. The anode for a lithium air battery of claim 1, wherein the liquid electrolyte comprises one or more solvents selected from dimethyl carbonate, diethyl carbonate, ethyl methyl carbonate, dipropyl carbonate, methylpropyl carbonate, ethylpropyl carbonate, ethylene carbonate, propylene carbonate, butylene carbonate, methyl acetate, ethyl acetate, n-propyl acetate, dimethyl acetate, methyl propionate, ethyl propionate, γ-butyrolactone, decanolide, valerolactone, mevalonolactone, caprolactone, dibutyl ether, tetraglyme, diglyme, polyethyleneglycoldimethylether, dimethoxyethane, 2-methyltetrahydro furan, 2,2-dimethyltetrahydrofuran, 2,5-dimethyltetrahydrofuran, tetrahydrofuran, cyclohexanone, triethylamine, triphenylamine, triethylphosphineoxide, acetonitrile, dimethylformamide, 1,3-dioxolane, sulfolane, triglyme, methylbutylether, and ethylbutylether.

13. The anode for a lithium air battery of claim 1, wherein a conductivity of the liquid electrolyte is 0.01 Siemens per meter or greater at a temperature of 20° C.

14. The anode for a lithium air battery of claim 1, wherein the first protective layer further comprises a separator.

15. The anode for a lithium battery of claim 1, wherein the ion conductive solid electrolyte membrane of the second protective layer comprises one or more selected from a lithium ion conductive glass and a crystalline lithium ion conductive material.

16. The anode for a lithium battery of claim 15, wherein the one or more selected from a lithium ion conductive glass and a crystalline lithium ion conductive material comprises $Li_{1+x+y}(Al, Ga)_x(Ti, Ge)_{2-x}Si_yP_{3-y}O_{12}$ wherein $0 \leq x \leq 1$ and $0 \leq y \leq 1$, a lithium-aluminum-germanium-phosphate, a lithium-aluminum-titanium-phosphate, and a lithium-aluminum-titanium-silicon-phosphate.

17. The anode for a lithium air battery of claim 1, wherein the anode active material layer comprises one or more selected from a lithium metal, a lithium metal alloy, and a lithium intercalation compound.

18. A lithium air battery comprising:
the anode according to claim 1;
a cathode spaced apart from the anode, wherein the cathode is effective to utilize oxygen as a cathode active material; and
a liquid electrolyte disposed between the cathode and the anode.

19. The lithium air battery of claim 18, further comprising an additional separator disposed between the anode and the cathode.

20. The lithium air battery of claim 18, wherein the cathode comprises a conductive material.

21. The lithium air battery of claim 20, wherein the conductive material comprises a porous carbonaceous material.

22. The lithium air battery of claim 18, wherein the cathode further comprises an oxygen oxidation/reduction catalyst.

* * * * *